W. H. BROWN.
LEAF SPRING LUBRICATOR.
APPLICATION FILED JAN. 24, 1917.
1,241,817.
Patented Oct. 2, 1917.
2 SHEETS—SHEET 1.
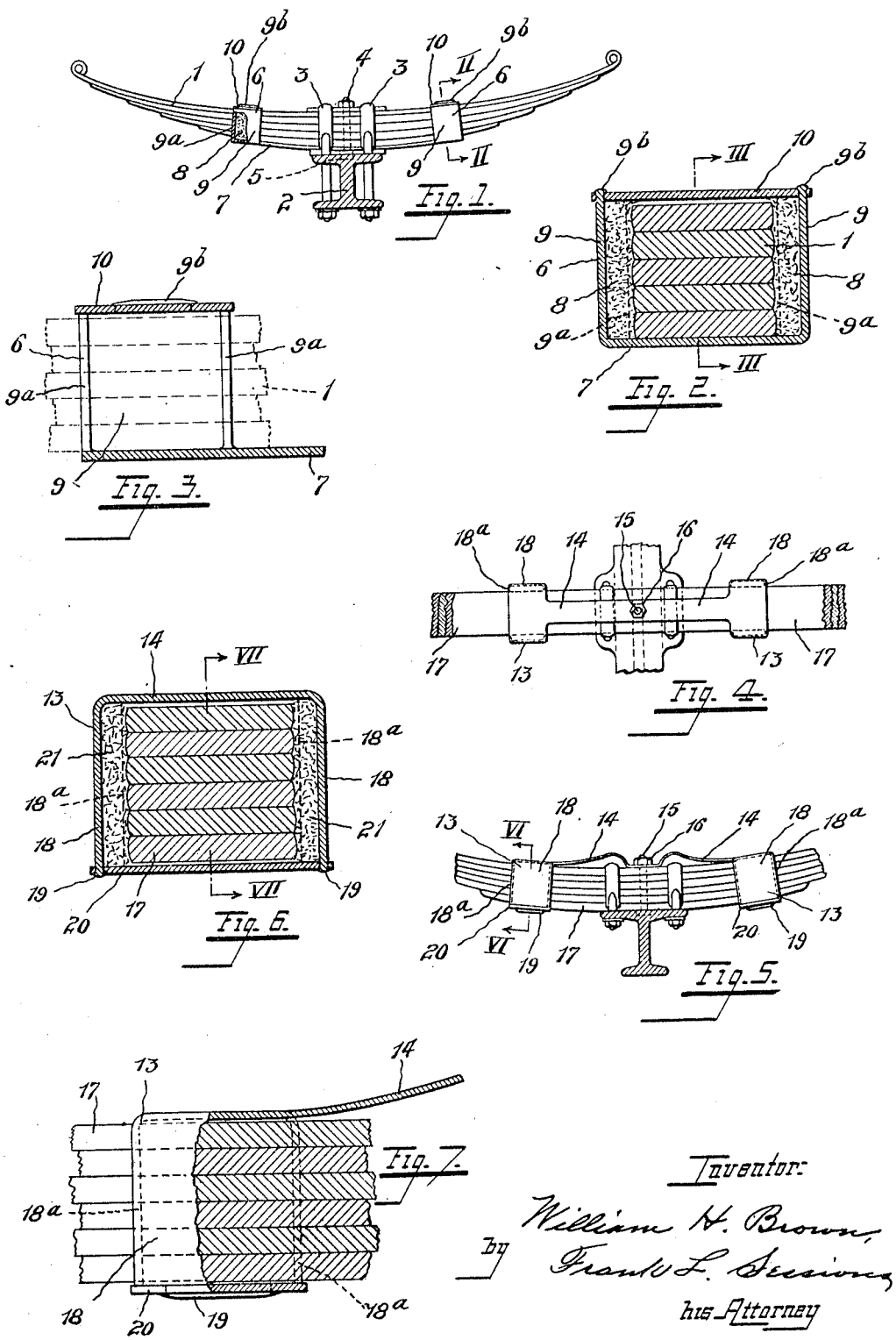

W. H. BROWN.
LEAF SPRING LUBRICATOR.
APPLICATION FILED JAN. 24, 1917.
1,241,817.
Patented Oct. 2, 1917.
2 SHEETS—SHEET 2.
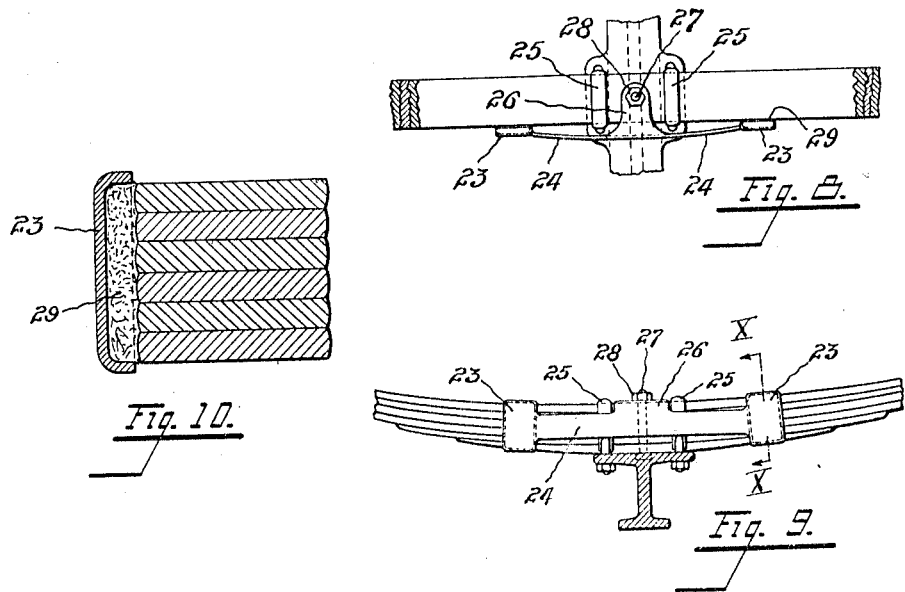
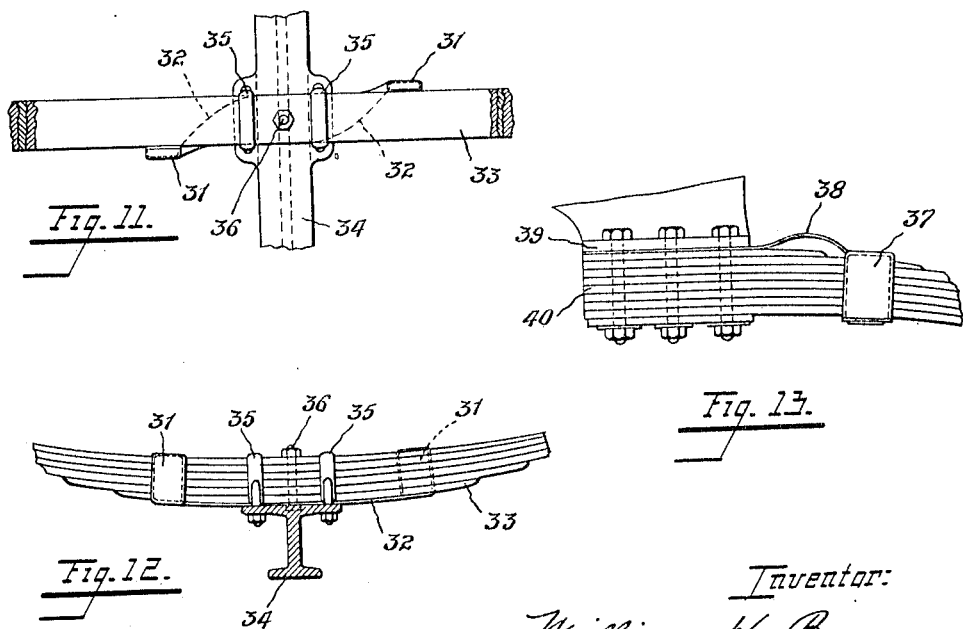
Inventor:
William H. Brown,
by Frank L. Sessions,
his Attorney

UNITED STATES PATENT OFFICE.

WILLIAM H. BROWN, OF CLEVELAND, OHIO.

LEAF-SPRING LUBRICATOR.

1,241,817.  Specification of Letters Patent.  Patented Oct. 2, 1917.

Application filed January 24, 1917. Serial No. 144,193.

*To all whom it may concern:*

Be it known that I, WILLIAM H. BROWN, a citizen of the United States, residing at Cleveland, in the county of Cuyahoga and State of Ohio, have invented certain new and useful Improvements in Leaf-Spring Lubricators, of which the following is a specification.

My invention relates to multi-ply leaf spring lubricators of the type shown in my pending application, Serial No. 828,137, filed March 30, 1914, although in a broader sense it is applicable to lubricators of other forms which are designed to lubricate the contact surfaces of multi-ply leaf springs. It has for its principal object the provision of a lubricator adapted to deliver lubricant to the contacting surfaces of multi-ply leaf springs and held, longitudinally of the spring, in fixed relation to the spring seat or support. With this object in view I have devised means for the attachment of leaf spring lubricators which may be readily secured in place so that the lubricator may properly perform its functions and not work loose or become shifted by the continual inter-action between the spring leaves which goes on whenever the vehicle to which the spring is attached is in motion.

In the general construction of vehicles the spring is seated upon and secured to the vehicle axle or to the vehicle frame or body. It is at, or, in fixed relation to such a spring seat or supporting and anchoring member that I secure the lubricator attachment means substantially as herein described.

Referring to the drawings, Figure 1 is a side elevation of a leaf spring mounted upon an axle and equipped with a pair of two-sided lubricators secured or anchored in accordance with my invention.

Fig. 2 is an enlarged section on line II—II of Fig. 1.

Fig. 3 is a section on line III—III of Fig. 2.

Fig. 4 is a plan view of a leaf spring mounted upon an axle and equipped with a pair of two-sided lubricators secured in position in a modified manner.

Fig. 5 is a side elevation of the structure shown in Fig. 4.

Fig. 6 is an enlarged transverse section on line VI—VI of Fig. 5.

Fig. 7 is an enlarged part section on line VII—VII, Fig. 6 and part side elevation of the structure shown in Fig. 4.

Fig. 8 is a plan view of a leaf spring mounted upon an axle and equipped with a pair of single sided lubricators, applied to the same edges of the spring leaves and secured in substantially the manner shown in Figs. 4 and 5.

Fig. 9 is a side elevation of the structure shown in Fig. 8.

Fig. 10 is an enlarged section on line X—X of Fig. 9.

Fig. 11 is a plan view of a leaf spring mounted upon an axle and equipped with a pair of single sided lubricators applied to opposite edges of the spring leaves and secured in the manner shown in Fig. 1.

Fig. 12 is a side elevation of the structure shown in Fig. 11.

Fig. 13 is a side elevation of a quarter-elliptic leaf spring secured to the frame or body of a vehicle and equipped with only one lubricator which may be either single or double sided.

Referring to Figs. 1, 2 and 3, reference numeral, 1, is a multi-ply leaf spring of the well known semi-elliptic form; 2 represents the axle of a vehicle to which spring, 1, is secured by means of the usual spring clips, 3, 3. The customary assembling bolt, 4, is shown having its head, 5, serving as a dowel pin in a suitable recess in the axle for the purpose of positioning the spring thereon. Assembled with the spring are the lubricators 6, 6, which are shown formed integrally with or fixed to the connecting and anchoring member, 7, which extends along the bottom of the spring and is held in place by the spring clips, 3, 3, and assembling bolt, 4, exactly as though it were a spring leaf.

The lubricators, 6, 6, are shown as being of the type in which pads of fibrous, absorbent material, 8, 8, saturated with oil, are held under limited compression against the edges of the spring leaves in compartments formed by the walls, 9, 9, of the lubricator, the edges 9$^a$ of which are bent in toward the spring to retain the pads from endwise displacement. A metal cap, 10, is shown extending across the top of the spring, and connected to the side walls, 9, 9, by the riveted projections, 9$^b$. The height of the side walls, 9, is such that the lubricators, 6, do not clamp the leaves of the spring and they are, therefore, as free to slide and vibrate upon each other as though the lubricators were not present. It will be seen that the lubricators thus far described are held by means secured at the point where the spring is anchored to the vehicle axle by the same means by which the spring is secured to the axle. It is to be noted also that the lubricators, thus secured, cannot be displaced by the movement of the spring leaves upon each other.

In Figs. 4, 5, 6 and 7, is shown a pair of lubricators, 13, 13, secured in a modified manner from that shown in Figs. 1, 2 and 3. In the form of attachment shown in Figs. 4, 5, 6 and 7, connecting member, 14, extends along the top of the spring, and is provided with a hole at the center through which an assembling bolt, 15, passes. A nut, 16, secures the connecting member, 14, to the top of the spring, 17. This means of attachment may be advantageously used upon springs which are already assembled upon the vehicle and provides a convenient means for mounting the lubricators upon the springs without removing the springs from the vehicle. The side walls, 18, 18, of the lubricator shown in Figs. 4, 5, 6 and 7, are shown formed integrally with the connecting member, 14, although it is to be understood that they may be separately formed and attached to the connecting member. The bottom ends, 19, of the side walls extend downward beyond the spring as shown in Fig. 6, and a plate, 20, is secured to them for the purpose of retaining the lubricating pads, 21, in position. The end walls, 18ª, 18ª, of the lubricator, are bent in toward the spring to retain the lubricating pads, 21, in longitudinal position and to complete the compartment in which the pads are located. It will be seen that the lubricators shown in Figs. 4, 5, 6, and 7 are held by means secured at a point which is fixed in relation to the spring seat and the supporting axle.

In Figs. 8, 9 and 10, I have shown single sided lubricators in which the lubricating pads are applied to only one edge of the leaf spring. In this form the single sided lubricators, 23, 23, are shown connected by a spring metal plate, 24, extending along one side of the leaf spring and shaped so as to clear the spring clips, 25. An angle piece, 26, is formed from or attached to the connecting member, 24, and is arranged to be secured upon the spring assembling bolt, 27, by the nut, 28, in a manner similar to the method of securing the connecting member, 14, to the bolt, 15, shown in Figs. 4 and 5. The lubricator, 23, will be seen to be a shallow, rectangular compartment having an open side presented to the edges of the spring leaves and containing the lubricating pad, 29.

In Figs. 11 and 12, I have shown a form of single sided lubricator similar to that shown in Figs. 8, 9 and 10, with the exception that instead of being applied to the same edge of the spring, the lubricators, 31, are applied to opposite edges of the spring, and instead of being attached to the spring in the manner shown in Figs. 8, 9 and 10, the method of attachment shown in Fig. 1 is followed, the connecting member, 32, being shown as extending along the bottom of the spring, 33, and being clamped with the spring to the axle, 34, by the clips, 35, and held in position by the assembling bolt, 36.

In Fig. 13 I have shown a form of lubricator similar to that shown in Figs. 4, 5, 6 and 7, but, in Fig. 13, I employ only one lubricator, 37, as it is applied to what is commonly known as a quarter-elliptic spring. The connecting member, 38, is clamped under the spring support, 39, between it and the spring, 40, as though the connecting member were one of the leaves of the spring. It will be apparent that the lubricator, 37, may have only a single pad applied to one edge of the spring leaves, similar to the type shown in Fig. 8, or it may be double sided and have two pads similar to the type shown in Fig. 6.

It will also be understood that any well known provision may be made for injecting oil into the lubricant holding pads in the particular type of lubricator herein shown, and that various changes and modifications of my invention may be made without departing from its scope.

This application is a continuation in part of my aforesaid application Serial No. 828,137. Pat. #1,215,904.

I claim and desire to secure by Letters Patent:

1. A lubricator for leaf springs comprising an oiler at one side of the spring seat and held in fixed relation to the spring seat by means secured to said seat.

2. A lubricator for leaf springs comprising an oiler at one side of the spring seat and held in fixed relation to the spring seat by means secured to the spring supporting member to which the spring is attached.

3. A lubricator for leaf springs comprising a pair of oilers, one at each side of the spring seat and held in fixed relation to the spring seat by means secured to said seat.

4. A lubricator for leaf springs comprising a pair of oilers, one at each side of the spring seat, and held in fixed relation to the spring seat by means secured to the spring supporting member to which the spring is attached.

5. The combination with a spring-seat and a multi-ply leaf spring attached thereto, of a lubricating appliance embodying a member extending along the spring, across the point of attachment of the spring to its seat, said member carrying an oiling appliance at each end, whereby the spring is oiled at each side of the point where the leaves have a fixed relation to each other.

6. The combination with a spring-seat and a multi-ply leaf spring attached thereto, of a lubricating appliance embodying a member extending along under the spring and clamped between the spring and the seat, said member carrying an oiling appliance at each end, whereby the spring is oiled at each side of the point where the leaves have a fixed relation to each other.

7. The combination with a spring-seat and a multi-ply leaf spring attached thereto, of a lubricating appliance embodying a member extending along under the spring and clamped between the spring and the seat, said member carrying an oiling appliance at each end, which appliance embraces the spring and forms pockets at each side thereof, each of said pockets containing an oil distributing pad.

In testimony whereof I affix my signature in the presence of two witnesses.

WILLIAM H. BROWN.

Witnesses:
FRANK L. SESSIONS,
FRANCES MANN.

Copies of this patent may be obtained for five cents each, by addressing the "Commissioner of Patents, Washington, D. C."